United States Patent [19]

Dennerlein et al.

[11] Patent Number: 5,117,504
[45] Date of Patent: May 26, 1992

[54] COMMUNICATIONS DEVICE WITH ADJUSTMENT FOR TEMPERATURE DEPENDENT SIGNAL DELAYS

[75] Inventors: Ludwig Dennerlein; Hubert Weber, both of Eckental, Fed. Rep. of Germany

[73] Assignee: U.S. Philips Corporation, New York, N.Y.

[21] Appl. No.: 455,720

[22] Filed: Dec. 21, 1989

[30] Foreign Application Priority Data

Dec. 22, 1988 [DE] Fed. Rep. of Germany ....... 3843181

[51] Int. Cl.[5] .......................... H04B 17/00; H03K 5/13
[52] U.S. Cl. ..................... 455/67.1; 455/88; 455/115; 307/591
[58] Field of Search ............ 455/88, 115–116, 455/226, 231, 242, 276, 33, 73, 51, 67–70, 186; 379/59; 307/591; 332/159; 375/60; 371/33

[56] References Cited

U.S. PATENT DOCUMENTS 4,473,762  9/1984  Iwahashi et al. .................. 307/591
4,684,897  8/1987  Richards et al. ................... 307/591

*Primary Examiner*—Reinhard J. Eisenzopf
*Assistant Examiner*—Andrew Faile
*Attorney, Agent, or Firm*—David R. Treacy

[57] ABSTRACT

A communications device in which a control unit and a delay unit transmit a time-shifted acknowledge signal in response to a received message. For the purpose of adhering exactly to the difference in time between receiving the request signal and sending the acknowledge signal, the control unit is connected to a temperature sensor and an adjustment-value memory. By means of the temperature sensor the control unit takes an adjustment value from the appropriate memory address and passes this adjustment value to the delay unit for determining the delay time. A field of application is, for example, mobile radio receivers for car telephone systems.

16 Claims, 1 Drawing Sheet

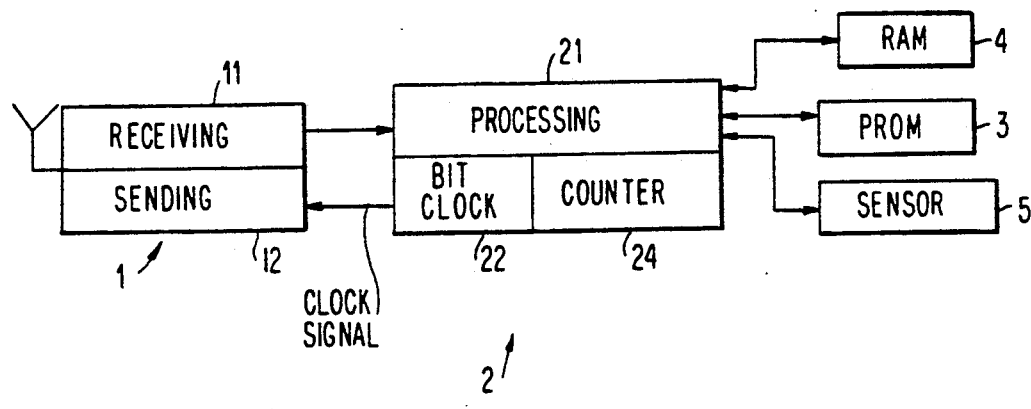

COMMUNICATIONS DEVICE WITH ADJUSTMENT FOR TEMPERATURE DEPENDENT SIGNAL DELAYS

BACKGROUND OF THE INVENTION

The invention relates to a communications device comprising a control unit and a delay unit, with which an acknowledge signal shifted in time relative to a received message can be transmitted.

In a mobile radio system like, for example, the C-network of the German Post-Office, the radio coverage area is divided into radio cells with respect to space and organisation. A stationary radio station generally located in the middle of such a radio cell provides the radio communication with all the mobile radio telephone sets located in this radio cell. The allocation of a mobile radio telephone set to a specific radio cell can be effected by means of distance measuring.

For this purpose, each stationary radio station receiving a request for establishing a call from a mobile radio telephone set sends a transmission request for an acknowledge signal. The period of time between receiving the request signal and sending the acknowledge signal is considered the response time. In order to obtain comparable results the radio telephone set has a fixed response time. The measured difference in time between receiving the request signal and sending the acknowledge signal provides the signal delay between the stationary radio station and the mobile radio telephone set after subtracting this response time. The distance between the stationary radio station and the mobile radio telephone set is computed from this signal delay. In order to avoid erroneous computations of the receiving instant, the response time is to be adhered to exactly.

SUMMARY OF THE INVENTION

It is an object of the invention to provide a device of the type mentioned in the opening paragraph in a manner such that a presettable response time is adhered to exactly.

This object is achieved in that the control unit is connected to a temperature sensor and an adjustment-value memory and in that different delays can be obtained by means of the delay unit.

BRIEF DESCRIPTION OF THE DRAWING

The invention will be further described and explained in the following detailed description with reference to the drawing wherein:

The Sole FIGURE of the drawing is a schematic diagram of an embodiment of the communications device of the invention.

DETAILED DESCRIPTION OF THE PREFERRED EMBODIMENTS

The drawing FIGURE shows the transceiver unit 1 of a mobile radio telephone set, connected to a signal evaluation unit. The signal evaluation unit comprises in essence a microprocessor 2, a read-only memory 3 and a read-write memory 4. A sub-area of the read-only memory 3 contains an operating program by means of which the data received from the receiving section 11 of the transceiver 1 are buffered in the read-write memory 4 and processed in a processing section 21 of the microprocessor 2. Thus, for example, the received data are examined to find out whether they relate to a request signal for sending an acknowledge signal. In that case the acknowledge signal is formed and buffered in an output unit (not shown) of the sending section 12 of the transceiver 1.

It has appeared that the signal delay between the aerial input of the receiver and the interface to the microprocessor 2 or from the interface of the microprocessor to the aerial connection point is temperature-dependent during transmission. These temperature-dependent signal delays are caused, for example, in the transceiver unit by the coils and filters used and, in addition, also depend on the type of equipment used. Therefore, a Table of values is stored in a sub-area of the read-only memory 3 of the radio telephone set, in which Table are incorporated the signal delays at various ambient temperatures in the receiving section 11 and also in the sending section 12 of the transceiver unit 1.

For this purpose, when the transceivers are manufactured, their processing times are measured at various temperatures in an adjusting device which is not shown. From the results of these measurements adjustment values are computed which are used to adjust the temperature-dependent signal delays. These adjustment values are stored in the PROM 3 in a suitably encoded form. In the embodiment of the invention the temperature-dependent receiving sections of the receiver and the PROM are located on a common printed circuit board. This ensures that when a faulty receiving section is exchanged, the Table of values computed for this receiving section will be exchanged too.

A temperature sensor 5 is connected to the microprocessor 2. This temperature sensor 5 provides a voltage proportional to the ambient temperature of the transceiver 1, which voltage is converted into a digital value by the microprocessor 2. This digital value is a component of an address with which a memory location of the read-only memory 3 is addressed. The contents of the memory location of the read-only memory 3 addressed in this manner is the adjustment value assigned to a specific temperature range. The sending of the acknowledge signal is delayed by a period of time corresponding with the adjustment value read from the read-only memory 3, so that the response time of the described device is thus always maintained at a constant level irrespective of ambient temperatures.

In the embodiment of the invention the acknowledge signal is transmitted at a bit rate of 5.28 Kbit/sec. A response time of 150 ms with a maximum permissible deviation of 5 ms is preset. The permissible deviation is then shorter than the duration of a data bit of the acknowledge signal. Therefore, in the embodiment of the invention the bit clock 22 used for transmitting the buffered acknowledge signal is shifted relative to a free running reference clock by means of a phase shifter such as a counter so that the shifted bit clock commences exactly at the instant when the preset response time has elapsed. The maximum time-shift of the bit clock is then half a bit length of the acknowledge signal. Since this time interval exceeds differences in signal delays occurring in the receiving section used in the embodiment, each signal delay that occurs can be compensated for in this manner by means of a phase shift over the range of a clock signal of the bit clock.

In the embodiment of the invention a modulo-256 count-down counter 24 having a presettable initial value can be used as a phase shifter. The 256-fold clock frequency of the acknowledge signal is applied to the clock input of the counter as a reference clock. The reference clock available at a send output of the counter and divided by 256 is fed as a bit clock to the output unit of the sending section 1.

The adjustment value read out from the Table of values is applied to an appropriate input of the counter 24. By means of a pulse produced by the microprocessor, the counter takes over the adjustment value available at the appropriate inputs as a current delay value. With each clock signal of the reference clock the count of the counter is decremented until it has reached the value "zero". Once the count "zero" has been reached the counter will change its signal state at its send output. This is the beginning of the first clock of the acknowledge signal. In the embodiment of the invention the period of time necessary for equalizing the signal delays is indirectly stored in this way as the number of the reference clock signal elapsing in this period of time. This enables a simple storage of the adjustment values and a simple conversion of the adjustment values into a signal delay.

In an embodiment of the invention (not shown), which relates to applicability, in which the duration of a data signal clock exceeds the period of time over which delay is to take place, the input clock itself can be delayed by an adequate number of clock stages instead of shifting the phase of the input clock.

We claim:

1. A communications device comprising means for receiving a message and transmitting an acknowledge signal; a delay unit for providing a delay time; and a control unit for causing said means to transmit said acknowledge signal delayed by a given response time, said given response time including said delay time, in response to receipt of said message,
   characterized in that said device further comrpises means for adjusting said delay time, said means for adjusting comprising a temperature sensor for sensing a temperature within said device and an adjustment-value memory,
   said control unit controlling said memory to receive from said memory an adjustment value corresponding to said temperature sensed by said sensor, and said control unit controlling said delay unit to adjust said delay time to a value corresponding to said adjustment value.

2. Communications device as claimed in claim 1, characterized in that the adjustment-value memory (3) is a read-only memory.

3. Communications device as claimed in claim 1, characterized in that the adjustment value is applied to a phase shifter.

4. Communications device as claimed in claim 1, characterized in that a clock signal used for transmitting the acknowledge signal is suppressed over a number of clock intervals corresponding with the adjustment value.

5. Communications device as claimed in claim 2, characterized in that the adjustment value is applied to a phase shifter.

6. Communications device as claimed in claim 2, characterized in that the adjustment value is applied to a counter.

7. Communications device as claimed in claim 6, characterized in that a clock signal used for transmitting the acknowledge signal is suppressed over a number of clock intervals corresponding with the adjustment value.

8. A communications device as claimed in claim 1, characterized in that said memory stores a plurality of adjustment values for respective temperatures, corresponding to changes in signal delays in said means for receiving and transmitting as a function of temperature, said control unit thereby controlling said device to transmit the acknowledge signal with a fixed response time independent of temperature.

9. Communications device as claimed in claim 8, characterized in that the adjustment values are stored in addressable memory cells in the adjustment-value memory (3) and in that the output values of the temperature sensor (5) are converted into a binary form to address the adjustment-value memory (3).

10. Communications device as claimed in claim 3, characterized in that the adjustment-value memory (3) is a read-only memory.

11. Communications device as claimed in claim 8, characterized in that the adjustment value is applied to a phase shifter.

12. Communications device as claimed in claim 8, characterized in that a clock signal used for transmitting the acknowledge signal is phase shifted in accordance with the adjustment value.

13. Communications device as claimed in claim 8, characterized in that the adjustment value is applied to a counter.

14. Communications device as claimed in claim 8, characterized in that a clock signal used for transmitting the acknowledge signal is suppressed over a number of clock intervals corresponding with the adjustment value.

15. Communications device as claimed in claim 8, characterized in that the device is a radio receiver.

16. Communications device as claimed in claim 8, characterized in that the adjustment-value memory (3) is a read-only memory.

* * * * *